United States Patent Office 2,871,614
Patented Feb. 3, 1959

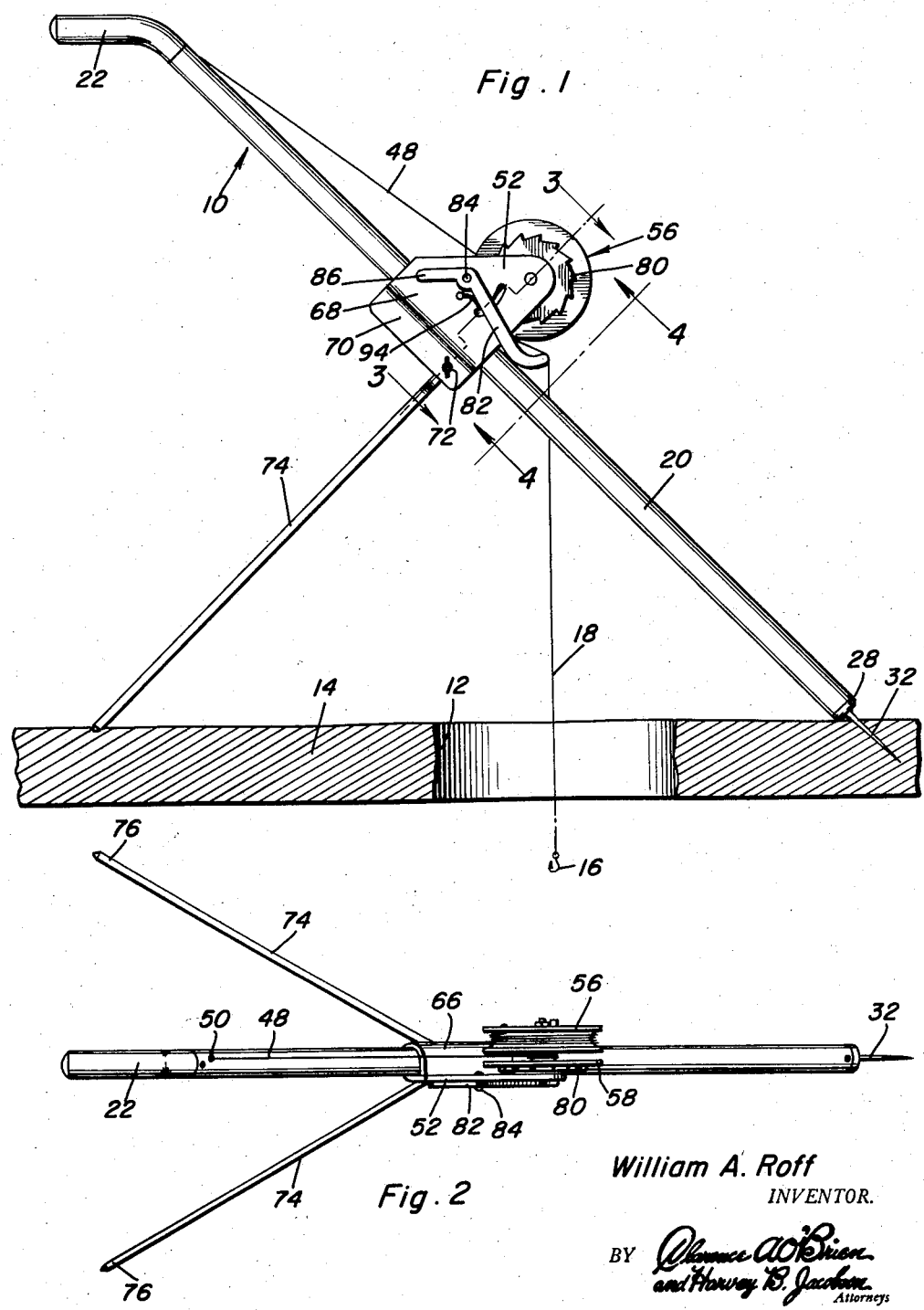

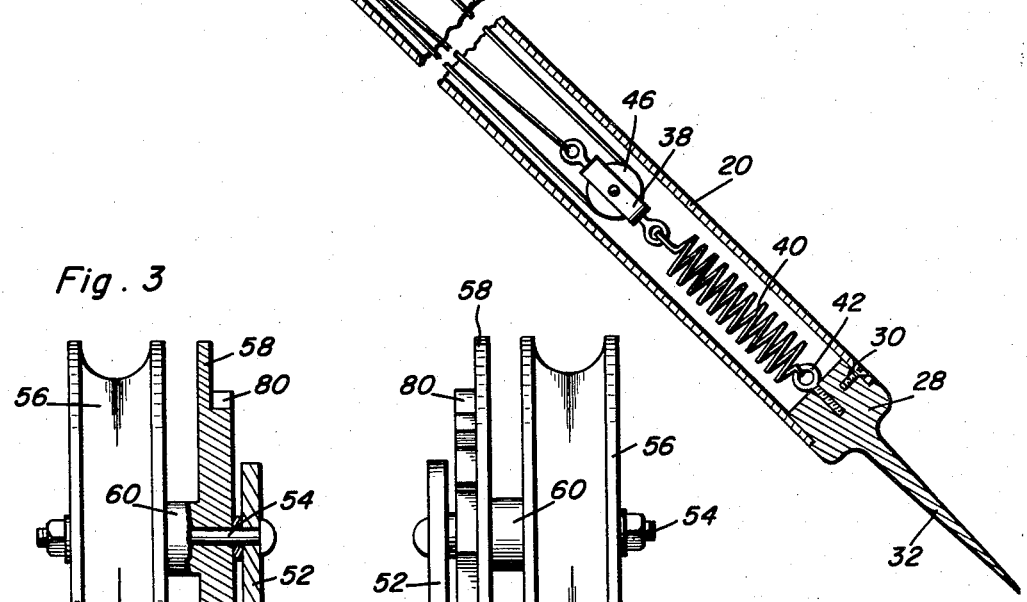

2,871,614

ICE FISHING DEVICE

William A. Roff, Crosby, Minn.

Application March 8, 1957, Serial No. 644,812

8 Claims. (Cl. 43—15)

This invention comprises a novel and useful ice fishing device and more particularly relates to a fishing rod especially adapted for fishing through holes in the ice and having an automatic actuator for the reel of a fishing line.

The principal object of this invention is to provide an ice fishing device which may be readily erected into operative position above a fishing hole in the ice and which may be collapsed into a readily portable fishing rod.

A further object of the invention is to provide a fishing device in accordance with the preceding objects wherein the reel for the fishing line shall be resiliently actuatable for winding in the fishing line when the line is struck by a fish.

A further object of the invention is to provide a device in accordance with the preceding objects wherein the resilient actuating mechanism for the reel shall be entirely housed within the hollow fishing rod and shall include a cable projecting therefrom and operatively connected to the reel for actuating the same.

A still further object of the invention is to provide a fishing device in accordance with the above mentioned objects wherein a resilient actuator is normally held inoperative by a stop means, the latter being so connected with the fishing line that tensioning of the same by the strike of a fish will release the stop means and permit the resilient actuating mechanism to reel in the fishing line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the fishing device of this invention placed in operative position above a fishing hole in readiness for use;

Figure 2 is a top plan view of Figure 1;

Figures 3 and 4 are vertical transverse sectional views taken substantially upon the plane indicated by the section lines 3—3 and 4—4 respectively of Figure 1, upon an enlarged scale; and Figure 5 is an enlarged vertical longitudinal sectional view through the fishing stick, parts being broken away, and showing the resilient actuating mechanism in the interior thereof.

In the embodiment in accordance with this invention as illustrated in the drawings the improved fishing device is indicated generally by the numeral 10 and is shown as operatively disposed over a fishing hole 12 formed in the ice 14 in order to control the operation of a fish hook 16 and a fishing line 18.

Referring first to Figure 5 it will be seen that the device 10 includes an elongated hollow body or tube 20 of metal or any other suitable construction and of a convenient size to function as a fishing rod. This tube is closed at its opposite extremities by an appropriately shaped handle 22 attached as by means of screw 24, and by a spiked plug 26 secured as by fastening screws 30 and having an outwardly axially extending spike 32. As shown in Figure 1, the spike is adapted to project into the ice 14 whereby to anchor the handle in suitable relation with respect to the fishing hole 12.

Housed within the chamber in the interior of the hollow elongated body 20 is a resilient means or actuating mechanism whereby the fishing line may be retracted and wound upon the fishing reel. This means includes a stationary or fixed block 34 which is mounted or connected by an eye-bolt 36 to the handle 22, together with a movable block 38 to which a coil spring 40 is connected, the other end of this coil spring being secured as by a bolt 42 to the spiked plug 28. It will thus be seen that the spring tends to move the movable block away from the fixed block.

Each of the blocks includes suitable pulleys 44 and 46 for the fixed and movable blocks respectively, and as will be apparent from Figure 4, the movable block may have one pulley and the fixed two pulleys whereby a cable 48 reeled over these pulleys will have a four-to-one mechanical advantage as to the spring 40. Of course, any other desired number of pulleys may be provided as deemed advisable.

Extending through the wall of the hollow body 20 adjacent the fixed block 34 is an opening 50 by means of which the cable 48 may be passed from the interior of the body to its exterior.

Referring now especially to Figures 1, 3 and 4, it will be seen that an upstanding plate 52 is provided forming a part of a bracket, this plate carrying an axle or shaft 54 upon which is mounted a reel 56 upon which the fishing line 18 is wound. Preferably integrally attached to the reel 56 at one side thereof is a plate 58 with an arbor 60 constituting a drum upon which the cable 48 is wound and secured, the drum thus constituting a connecting means whereby the cable is operatively connected with the reel for imparting rotation to the latter under the influence of the resilient actuating mechanism previously described.

At its lower end, the plate 52 of the bracket has secured thereto a further plate-like member 62 in parallel relation thereto, the upper end of the member 62 being welded as at 64 or otherwise rigidly connected with the lower end of the plate 52. Adjacent their lower ends, the plate 62 and the member 52 are provided with complementary semi-cylindrical portions 66 and 68 respectively which are adapted to embrace and clamp therebetween the hollow body 20 in the manner shown clearly in Figures 3 and 4.

The lower extremity of the plate 62 and the lower extremity of the plate 52, designated by the numeral 70, terminate in spaced relation to each other and are retained in clamped relation whereby the portions 66 and 68 will compressively grip the body 20, by means of a bolt and nut 72.

A part of rod-like legs 74 having pointed lower extremities as at 76, for engagement in the ice 14 to cooperate with the spike 32 for positioning the device, have angularly disposed upper ends 78 disposed in side-by-side relation and received between the parallel end portions 62 and 70, being pivotally connected to the latter as by the previously mentioned bolt 72.

It will thus be seen that the legs will be extended as at Figure 1, or may be folded into a closed position against the hollow body 20 for easy transportation and storage of the device.

A stop means is provided to prevent winding of the reel by the resilient actuating mechanism except when the fishing line is struck by a fish. This stop means preferably comprises a ratchet gear including gear teeth 80 formed in the side of the plate 58 which is adjacent to the bracket plate 52, together with a pawl comprising a lever 82, see Figure 1, secured to the bracket 52 as by a pivot pin 84. Beyond the pivot pin the lever 82 is provided with a handle portion 86 whereby the lever may be manually pivoted as desired.

Extending inwardly from a mid-portion of the lever is a finger 88 projecting through an arcuate slot 90 in the plate 52, which finger is thus movable upon pivotal movement of the lever into and out of engagement with the ratchet teeth 80. At its extremity, remote from the handle 86, the lever 82 is provided with a laterally projecting arm 92, see Figure 4, and is so positioned that the fishing line 18 may be entrained thereover as shown in Figure 1.

A spring of any convenient construction, such as a leaf spring 94 is operatively connected to the lever for urging the same in a direction to cause the finger 88 to engage the ratchet 80 and thus prevent rotation of the reel by the actuating mechanism within the hollow body 20.

The operation of the device is as follows:

With the device set up over a fishing hole as shown in Figure 1, the fishing line is pulled from the reel to cause the same to extend to the proper depth into the fishing hole 12 in the ice 14. The spring 94 will then urge the lever in such a direction that the finger 88 will engage the ratchet 80 and thus prevent the resilient mechanism within the barrel from reversing the rotation of the reel and wind in the fishing line.

However, when a fish strikes the hook 16, the tension applied by the same to the line 18 will exert a pressure against the arm 92 and thus through this arm cause rotation of the lever 82 to thereby withdraw the latch finger 88 from the ratchet and thus permit the spring 40 and the cable 48 through the operative connection with the reel, to rotate the drum in a direction to wind up the line and retrieve the fish.

It will be observed that the mechanical advantage afforded by the block and cable arrangement will enable a relatively limited travel of the spring and of the blocks associated therewith to produce a greatly amplified travel of the cable 48; and through a mechanical advantage of this cable and drum with respect to the periphery of the reel 56, to produce a still further mechanical advantage in reeling in the fishing line.

Although there has been disclosed in detail herein the structure and manner by which this device may be set up and employed for fishing through ice holes, it is to be understood that the invention may also be employed for fishing from shore or boat in the conventional manner by omitting the spike 32 and the legs 74, whereby the rod 20 may be manually manipulated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An ice fishing stick comprising an elongated hollow body having an opening through a side wall extending into its hollow interior, a reel having a fishing line wound thereon, a bracket for mounting said reel upon said body, resilient means inside said hollow body and including a cable extending through said aperture, connecting means operatively connecting said cable to said reel whereby the tensioning of said cable by said resilient means yieldingly urges the reel in a direction to wind said fishing line thereon, stop means preventing rotation of said reel by said cable and resilient means and a connection between said fishing line and said stop means for disengaging the latter upon predetermined tensioning of said fishing line.

2. The combination of claim 1 including a pair of supporting legs pivoted at one end of each to said body at a mid-portion of the latter.

3. The combination of claim 1 wherein said body comprises a tube, a handle closing one end of said tube and a spiked plug closing its other end.

4. The combination of claim 1 wherein said connecting means comprises a drum secured to a side of said reel, said cable being wound upon said drum.

5. The combination of claim 1 wherein said resilient means includes a fixed block and a movable block inside said body, and a spring secured to said movable block and yieldingly urging the latter from said fixed block, said cable being reeved over pulleys carried by said blocks.

6. The combination of claim 1 wherein said stop means comprises ratchet teeth operatively associated with said reel, and a pawl pivoted to said bracket and having a finger engaging said ratchet teeth and having an arm engaged by said fishing line.

7. The combination of claim 1 including a pair of supporting legs pivoted at one end of each to said body at a mid-portion of the latter, said bracket embracing said body and said legs being pivoted to said bracket.

8. The combination of claim 1 wherein said resilient means includes a fixed block and a movable block inside said body, and a spring secured to said movable block and yieldingly urging the latter from said fixed block, said cable being reeved over pulleys carried by said blocks, said body comprising a tube, a handle closing one end of said tube and a spiked plug closing its other end, said movable block and said spring being anchored to said handle and spiked plug.

References Cited in the file of this patent

UNITED STATES PATENTS

| | | |
|---|---|---|
| 2,746,194 | Lonnman | May 22, 1956 |

FOREIGN PATENTS

| | | |
|---|---|---|
| 820,041 | France | July 19, 1937 |